(12) United States Patent
Chainani et al.

(10) Patent No.: US 10,387,415 B2
(45) Date of Patent: Aug. 20, 2019

(54) DATA ARRANGEMENT MANAGEMENT IN A DISTRIBUTED DATA CLUSTER ENVIRONMENT OF A SHARED POOL OF CONFIGURABLE COMPUTING RESOURCES

(71) Applicant: International Business Machines Corporation, Armonk, NY (US)

(72) Inventors: Naresh K. Chainani, Portland, OR (US); James H. Cho, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 15/196,017

(22) Filed: Jun. 28, 2016

(65) Prior Publication Data

US 2017/0371928 A1 Dec. 28, 2017

(51) Int. Cl.
*G06F 16/00* (2019.01)
*G06F 16/2453* (2019.01)
(Continued)

(52) U.S. Cl.
CPC ...... *G06F 16/24549* (2019.01); *G06F 16/245* (2019.01); *G06F 16/248* (2019.01); *G06F 16/2471* (2019.01); *G06F 16/24545* (2019.01); *G06F 16/24554* (2019.01); *G06F 16/958* (2019.01)

(58) Field of Classification Search
CPC .......... G06F 17/30023; G06F 17/3005; G06F 17/30103; G06F 17/30126; G06F 17/30424; G06F 17/30598; G06F 17/30601; G06F 17/30713; G06F 16/2272; G06F 16/182; G06F 16/2471; G06F 16/958; G06F 16/24545; G06F 16/24549; G06F 16/248; G06F 16/24; G06F 16/245
See application file for complete search history.

(56) References Cited

U.S. PATENT DOCUMENTS 6,038,651 A * 3/2000 VanHuben ............. G06F 9/505
 712/17
6,807,557 B1 10/2004 Novaes et al.
(Continued)

OTHER PUBLICATIONS

Mell, Peter, et al., The NIST Definition of Cloud Computing, National Institute of Standards and Technology, Oct. 7, 2009, Version 15, NIST, Gaithersburg, MD, US.
(Continued)

*Primary Examiner* — Srirama Channavajjala
(74) *Attorney, Agent, or Firm* — L. Jeffrey Kelly

(57) ABSTRACT

Disclosed aspects relate to data arrangement management in a distributed data cluster environment of a shared pool of configurable computing resources. In the distributed data cluster environment, a set of data is monitored for a data redistribution candidate trigger. The data redistribution candidate trigger is detected with respect to the set of data. Based on the data redistribution candidate trigger, the set of data is analyzed with respect to a candidate data redistribution action. Using the candidate data redistribution action, a new data arrangement associated with the set of data is determined. Accordingly, the new data arrangement is established.

20 Claims, 6 Drawing Sheets

(51) Int. Cl.
*G06F 16/2455* (2019.01)
*G06F 16/958* (2019.01)
*G06F 16/2458* (2019.01)
*G06F 16/248* (2019.01)
*G06F 16/245* (2019.01)

(56) References Cited

U.S. PATENT DOCUMENTS

| | | | | |
|---|---|---|---|---|
| 6,947,957 | B1* | 9/2005 | Lange | G06F 11/079 |
| | | | | 707/687 |
| 7,281,013 | B2* | 10/2007 | Chaudhuri | G06F 16/284 |
| | | | | 707/602 |
| 8,131,711 | B2 | 3/2012 | Xu et al. | |
| 8,307,014 | B2 | 11/2012 | Mehrotra et al. | |
| 8,762,538 | B2* | 6/2014 | Dutta | G06F 9/5066 |
| | | | | 709/223 |
| 8,805,978 | B1* | 8/2014 | Anthonisamy | G06F 9/5072 |
| | | | | 709/208 |
| 8,818,948 | B2 | 8/2014 | Lin et al. | |
| 8,972,478 | B1* | 3/2015 | Storer | G06F 3/061 |
| | | | | 709/201 |
| 2004/0059805 | A1* | 3/2004 | Dinker | G06F 11/2069 |
| | | | | 709/223 |
| 2006/0053216 | A1* | 3/2006 | Deokar | G06F 21/6218 |
| | | | | 709/223 |
| 2007/0271570 | A1* | 11/2007 | Brown | G06F 9/5033 |
| | | | | 718/105 |
| 2009/0248631 | A1* | 10/2009 | Alba | G06F 16/2457 |
| 2010/0023515 | A1* | 1/2010 | Marx | G06F 17/30598 |
| | | | | 707/E17.005 |
| 2010/0082602 | A1* | 4/2010 | Ganapathi | G06F 16/24545 |
| | | | | 707/718 |
| 2010/0153363 | A1* | 6/2010 | Suzuki | G06F 17/30463 |
| | | | | 707/720 |
| 2011/0295814 | A1* | 12/2011 | Kothari | G06F 17/30306 |
| | | | | 707/687 |
| 2012/0109936 | A1* | 5/2012 | Zhang | G06F 11/3485 |
| | | | | 707/713 |
| 2012/0151266 | A1* | 6/2012 | Reed | G06F 11/0754 |
| | | | | 714/37 |
| 2013/0173586 | A1* | 7/2013 | Morris | G06F 16/24 |
| | | | | 707/713 |
| 2014/0215487 | A1* | 7/2014 | Cherkasova | G06F 9/5083 |
| | | | | 718/106 |
| 2015/0254325 | A1* | 9/2015 | Stringham | G06F 17/30584 |
| | | | | 707/737 |
| 2015/0261840 | A1 | 9/2015 | Clifford et al. | |

OTHER PUBLICATIONS

Kriakov, V., Kollios, G. & Delis, A. (2009). Self Tuning Management of Update Intensive Multidimensional Data in Clusters of Workstations. The VLBD Journal, 18, 739-764. doi: 10.1007/s00778-008-0121-2.

Tlili, R. & Slimany, Y. (2011). Executing Association Rule Mining Algorithms Under a Grid computing Environment. Proceedings of the Workshop on Parallel and Distributed Systems: Testing, Analysis, and Debugging, 53-61 doi: 10.1145/2002962.2002973.

IBM. (2009). Method and System Assigning Clustered data to database partitions without Data Redistribution. IPCOM000186372D, 1-4.

RethinkDB ; "Architecture FAQ"; <http://rethinkdb.com/docs/architecture/#how-does-rethinkdb-partition-data-into-shards>.

Amazon Web Services, Inc.; "Amazon Redshift Database Developer Guide (API Version Dec. 1, 2012)"; <http://docs.aws.amazon.com/redshift/latest/dg/t_Distributing_data.html>.

Redis; "Redis cluster tutorial"; <http://redis.io/topics/cluster-tutorial>.

* cited by examiner

DATA ARRANGEMENT MANAGEMENT IN A DISTRIBUTED DATA CLUSTER ENVIRONMENT OF A SHARED POOL OF CONFIGURABLE COMPUTING RESOURCES

BACKGROUND

This disclosure relates generally to computer systems and, more particularly, relates to data arrangement management in a distributed data cluster environment of a shared pool of configurable computing resources. Databases are used to store information for numerous types of applications. Examples include various industrial, commercial, technical, scientific, and educational applications. Database management systems (DBMSs) are a typical mechanism for accessing data stored in a database. DBMSs are typically configured to separate the process of storing data from accessing, manipulating, or using data stored in a database. DBMSs often require tremendous resources to handle the heavy workloads placed on such systems. As such, it may be useful to increase the performance of database management systems with respect to processing searches, or queries, to databases.

SUMMARY

Aspects of the disclosure relate to determining and establishing a new data arrangement in a distributed data cluster environment. Embodiments relate to a data redistribution action which can establish a new distribution key for a data structure that changes a workload pattern to reduce data movement during a query operation. Embodiments relate to deploying, to at least a threshold number of partitions in a distributed data cluster environment, a data structure which exceeds a data transmission frequency threshold. Data may be rearranged in an automated fashion for performance or efficiency benefits with respect to one or more query operations.

Disclosed aspects relate to data arrangement management in a distributed data cluster environment of a shared pool of configurable computing resources. In the distributed data cluster environment, a set of data is monitored for a data redistribution candidate trigger. The data redistribution candidate trigger is detected with respect to the set of data. Based on the data redistribution candidate trigger, the set of data is analyzed with respect to a candidate data redistribution action. Using the candidate data redistribution action, a new data arrangement associated with the set of data is determined. Accordingly, the new data arrangement is established.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
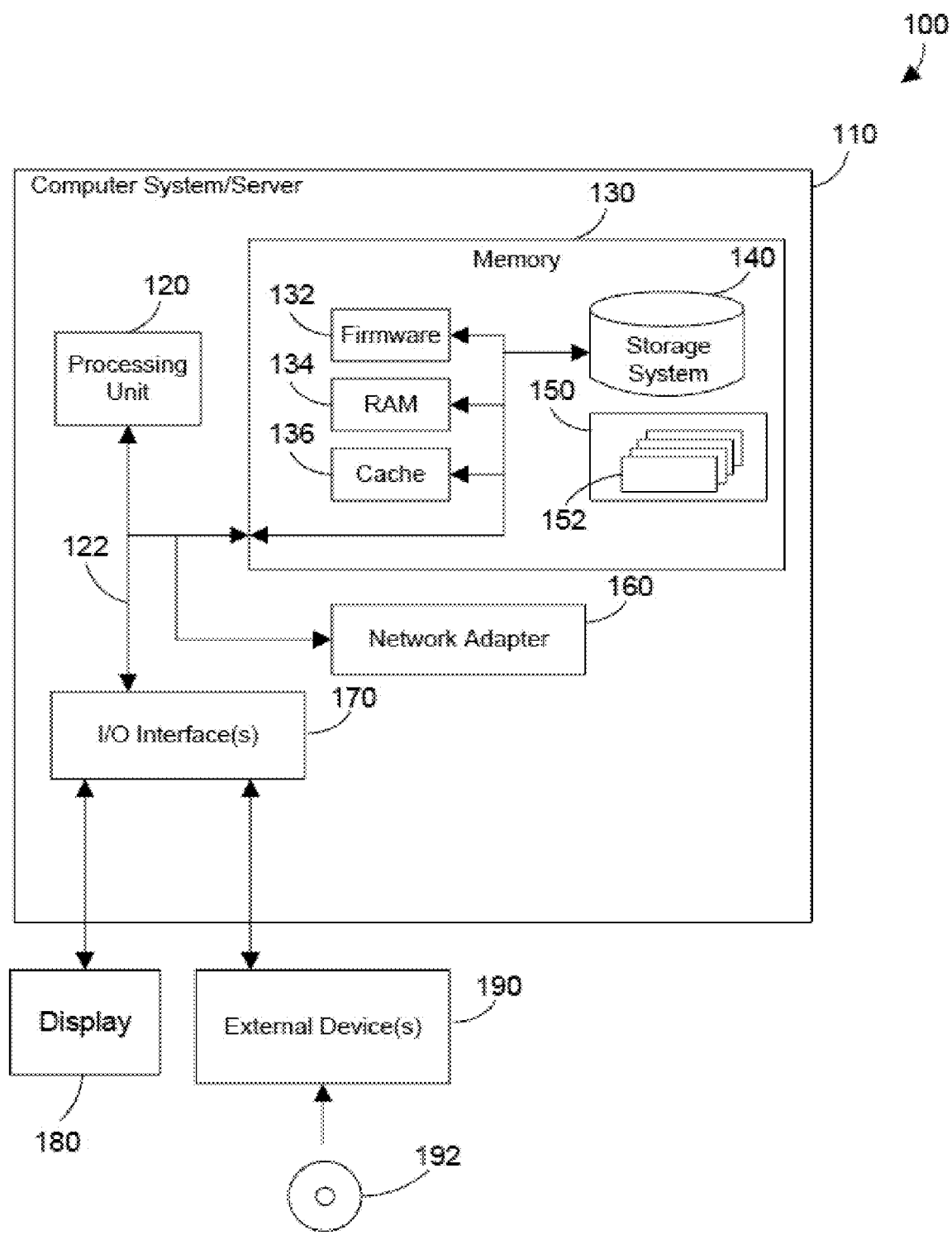
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to determining and establishing a new data arrangement in a distributed data cluster environment. Embodiments relate to a data redistribution action which can establish a new distribution key for a data structure that changes a workload pattern to reduce data movement during a query operation. Embodiments relate to deploying, to at least a threshold number of partitions in a distributed data cluster environment, a data structure which exceeds a data transmission frequency threshold. Data may be rearranged in an automated fashion for performance or efficiency benefits with respect to one or more query operations.

Shared-nothing systems can demonstrate effective scalability. Data may be distributed across partitions of a cluster in a shared-nothing manner where each partition owns a portion of the data. Query processing on such a system may distributed such that each partition works on data that they own. In a database system, query processing may include running complex reports involving joins and aggregation. For efficient performance, administrators of such systems may seek to reduce the amount of data that is transferred between partitions of the cluster. During physical database design, based on an understanding of data characteristics and query access patterns, a distribution key may be chosen to store the data such that the data is relatively evenly distributed and important parts of query processing are collocated. Sometimes the distribution key is not systematically selected and the first column is chosen without a substantive rationale or basis.

With more and more unstructured or semi-structured data being utilized, new use cases have emerged where systematic physical design is challenging. Take for instance a scenario where schema-less data is ingested from a data source into a relational database so that it can be analyzed. As part of this ingest, tools try and derive schema for this unstructured data so that it can be mapped into a strongly typed system for enhanced performance. In this case, it is challenging for a tool to systematically select an efficient distribution since it has limited information on the nature of the workload that is going to access the data. The same issue may exist with other attempts to simplify data movement where such tools are not aware of nor have access to data definition language (DDL). In addition, data characteristics may be modified from time-to-time. Also, the nature of queries accessing the data can change. Altogether, it can be challenging and expensive for a database administrator to respond to these changes and modify the physical design manually.

Disclosed aspects can detect challenges with a data distribution strategy, analyze a set of solutions, and tunes the system to implement the a new distribution strategy for a set of tables or indexes. An automated diagnostics phase can detect skew in the distribution or analyze query access patterns that result in significant data movement. Such significant data movement can occur because large tables are not distributed on a common join key or when small/medium-sized tables are not replicated to all partitions of the cluster. An automated analytics phase can explore various alternative distribution keys based on the workload that was analyzed and ask what-if questions (e.g., propose candidate data redistribution actions) for tables that could be replicated to one or more partitions. An automated tuning phase may, if a new distribution key is expected to help, redistribute the data on-disk using the new distribution strategy for the set of tables or indexes. In response to tuning, the systems may enter the diagnostics phase again. As such, it may recover from or respond to less-than-perfect selections, or respond to changes in workload.

Aspects of the disclosure include a computer-implemented method, system, and computer program product for data arrangement management in a distributed data cluster environment of a shared pool of configurable computing resources. In the distributed data cluster environment, a set of data is monitored for a data redistribution candidate trigger. The data redistribution candidate trigger is detected with respect to the set of data. Based on the data redistribution candidate trigger, the set of data is analyzed with respect to a candidate data redistribution action. Using the candidate data redistribution action, a new data arrangement associated with the set of data is determined. Accordingly, the new data arrangement is established.

In embodiments, detecting the data redistribution candidate trigger includes detecting a data skew of a data structure which exceeds a threshold data skew value. In such embodiments, the candidate data redistribution action may include a new distribution key for the data structure to reduce the data skew of the data structure. In embodiments, detecting the data redistribution candidate trigger includes detecting a data structure which indicates a workload pattern. In such embodiments, the candidate data redistribution action can include a new distribution key for the data structure to change the workload pattern to reduce data movement during a query operation. In embodiments, detecting the data redistribution candidate trigger includes detecting a data structure which exceeds a data transmission frequency threshold. In such embodiments, the candidate data redistribution action may include deploying the data structure which exceeds the data transmission frequency threshold to at least a threshold number of partitions in the distributed data cluster environment.

In embodiments, the set of data includes a set of diagnostic metadata for the distributed data cluster environment. The new data arrangement can positively impact a query performance metric when running a query in the distributed data cluster environment. Altogether, performance or efficiency benefits related to data arrangement management in a distributed data cluster environment of a shared pool of configurable computing resources may occur (e.g., speed, flexibility, load balancing, responsiveness, high availability, resource usage, productivity). Aspects may save computing resources such as bandwidth, processing, or memory.

If user does not explicitly specify an original distribution key, the system can perform an estimate to generate the original distribution key. This may be as trivial as looking at the first column of the table that can be used as a distribution key. For many applications, the first column is unlikely to be the best choice unless by coincidence. In embodiments, the distribution key could be either range-based or hash-based. Aspects can factor-in that the distribution key was implicitly determined (as opposed to explicitly specified) and may start monitoring the table for skew and query accesses to the table. If it detects data skew or expensive data movement (e.g., when query access frequently uses a join key column that is different from the distribution key column), a new copy of the table may be created using a different distribution key column. The table can remain available throughout.

The automated diagnostics phase may use internal metadata like table control blocks and queries to identify tables with data skew and gather data of (all) queries through statement cache filtering against equal join columns as potential distribution key candidates. The workload could be ad hoc or different at different times of the year and the self-diagnostics aspect can collect data that can be useful subsequently. The system can detect a workload pattern and predict what distribution keys could assist. In addition, small/medium tables that are repeatedly shipped for join processing may be identified. The automated analytics phase can analyze the diagnostic information and perform distribution skew analysis on potential distribution key candidates, simulate new distribution key candidates to gauge the impact of the new distribution key (e.g., to understand reduction of data movement during query operations), or simulate replicating small/medium tables to all partitions of the cluster. The automated tuning phase may perform a background redistribution of the table with a new distribution key. The redistribution may be carried-out online without interrupting system access. Also, the automated tuning phase can confirm response time improvement (e.g., via the background query execution). If the redistribution is determined to hinder more than help, it can be rolled back (before full implementation). If the redistribution is fully implemented, the original table may be removed in certain embodiments. Such phases may be repeated as often as needed in correspondence with the data growing and access patterns changing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
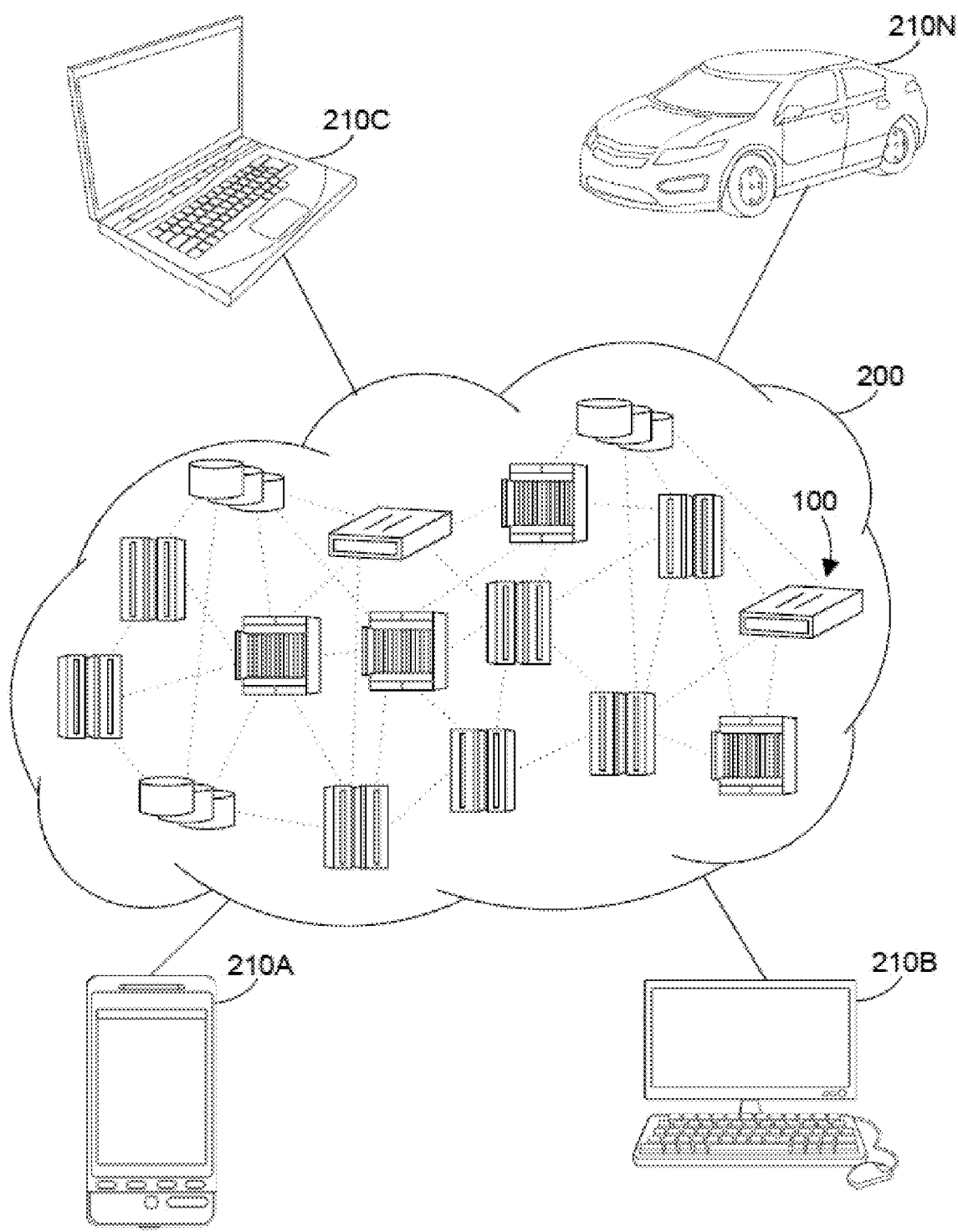
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
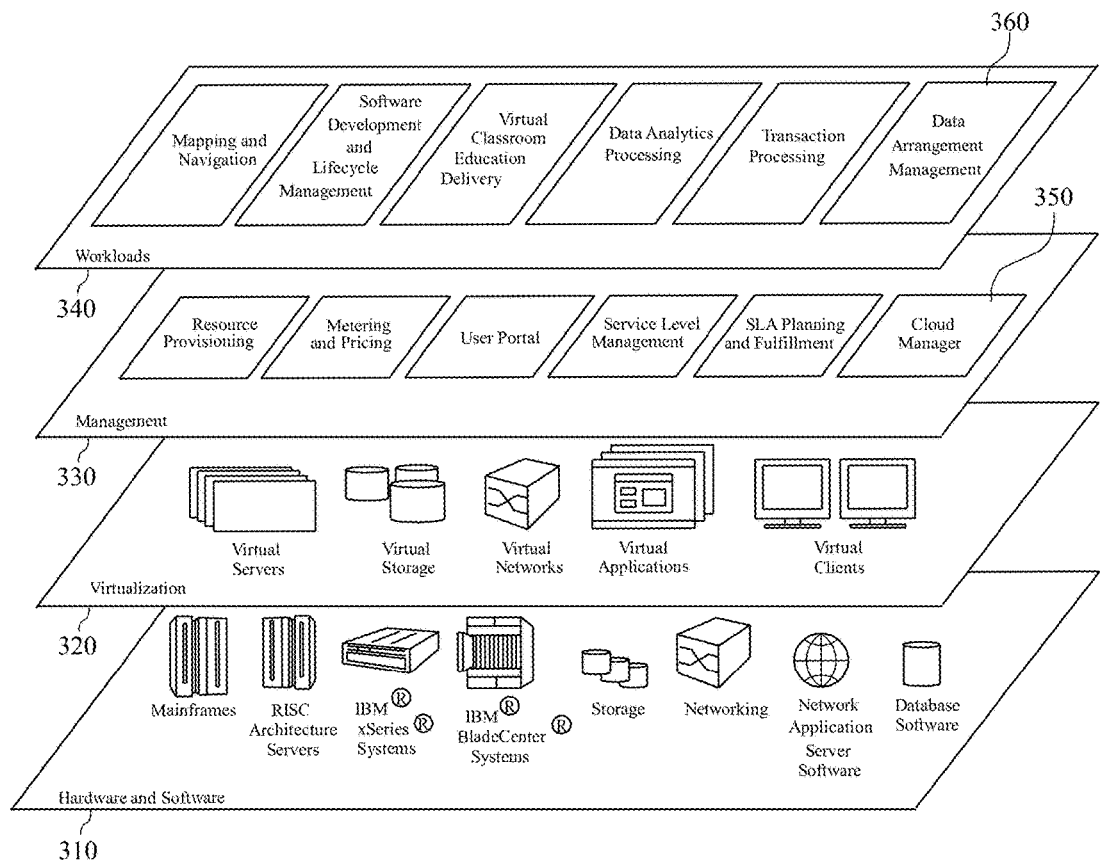
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM Web Sphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a data arrangement management layer 360, as discussed in more detail herein.

Figure 4:
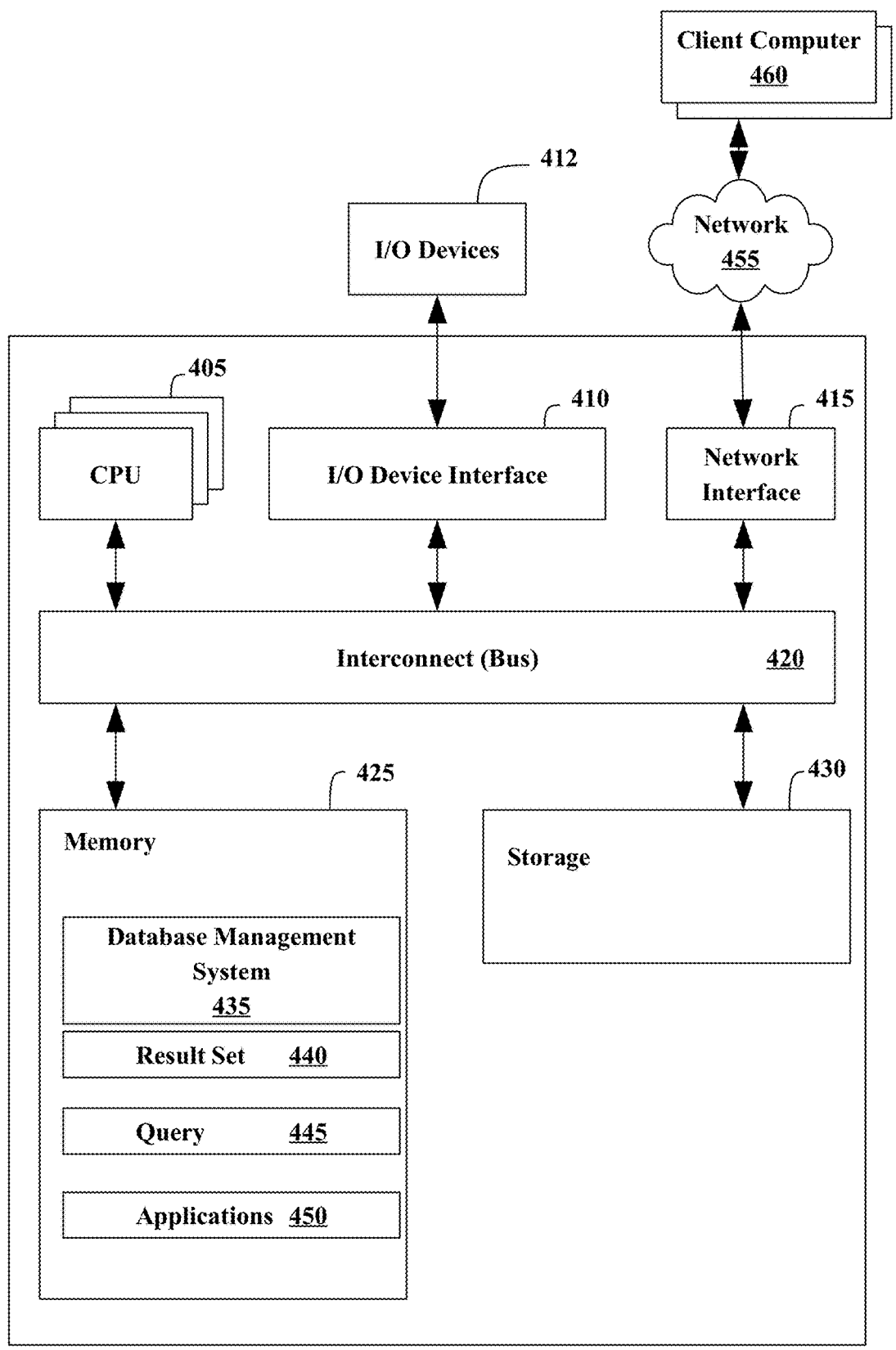
FIG. 4 illustrates an example representation of a computer system connected to a client computer via a network according to embodiments.

FIG. 4 illustrates an example representation of a computer system 400 connected to one or more client computers 460 via a network 455, according to some embodiments. For the purposes of this disclosure, computer system 400 may represent practically any type of computer, computer system, or other programmable electronic device, including but not limited to, a client computer, a server computer, a portable computer, a handheld computer, an embedded controller, etc. In some embodiments, computer system 400 may be implemented using one or more networked computers, e.g., in a cluster or other distributed computing system.

The computer system 400 may include, without limitation, one or more processors (CPUs) 105, a network interface 415, an interconnect 420, a memory 425, and a storage 430. The computer system 400 may also include an I/O device interface 410 used to connect I/O devices 412, e.g., keyboard, display, and mouse devices, to the computer system 400.

Each processor 405 may retrieve and execute programming instructions stored in the memory 425 or storage 430. Similarly, the processor 405 may store and retrieve application data residing in the memory 425. The interconnect 420 may transmit programming instructions and application data between each processor 405, I/O device interface 410, network interface 415, memory 425, and storage 430. The interconnect 420 may be one or more busses. The processor 405 may be a single central processing unit (CPU), multiple CPUs, or a single CPU having multiple processing cores in various embodiments. In one embodiment, a processor 405 may be a digital signal processor (DSP).

The memory 425 may be representative of a random access memory, e.g., Static Random Access Memory (SRAM), Dynamic Random Access Memory (DRAM), read-only memory, or flash memory. The storage 430 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 415 may be configured to transmit data via the communications network 455.

The memory 425 may include a database management system (DBMS) 435, a result set 440, a query 445, and applications 450. Although these elements are illustrated as residing in the memory 425, any of the elements, or combinations thereof, may reside in the storage 430 or partially in the memory 425 and partially in the storage 430. Each of these elements will be described in greater detail in accordance with FIG. 5.

The network 455 may be any suitable network or combination of networks and may support any appropriate protocol suitable for communication of data and/or code to/from the server computer system 400 and the client computer system 460. In some embodiments, the network 455 may support wireless communications. In other embodiments, the network 455 may support hardwired communications. The network 455 may be the Internet and may support Internet Protocol in some embodiments. In other embodiments, the network 455 may be implemented as a local area network (LAN) or a wide area network (WAN). The network 455 may also be implemented as a cellular data network. Although the network 455 is shown as a single network in the figures, one or more networks of the same or different types may be included.

The client computer system 460 may include some or all of the hardware and software elements of the computer system 400 previously described. As shown, there may be one or more client computers 460 connected to the computer system 400 via the network 455. In some embodiments, one or more client computers 460 may send a query 445 by network 455 to computer system 400 and receive a result set 440.

Figure 5:
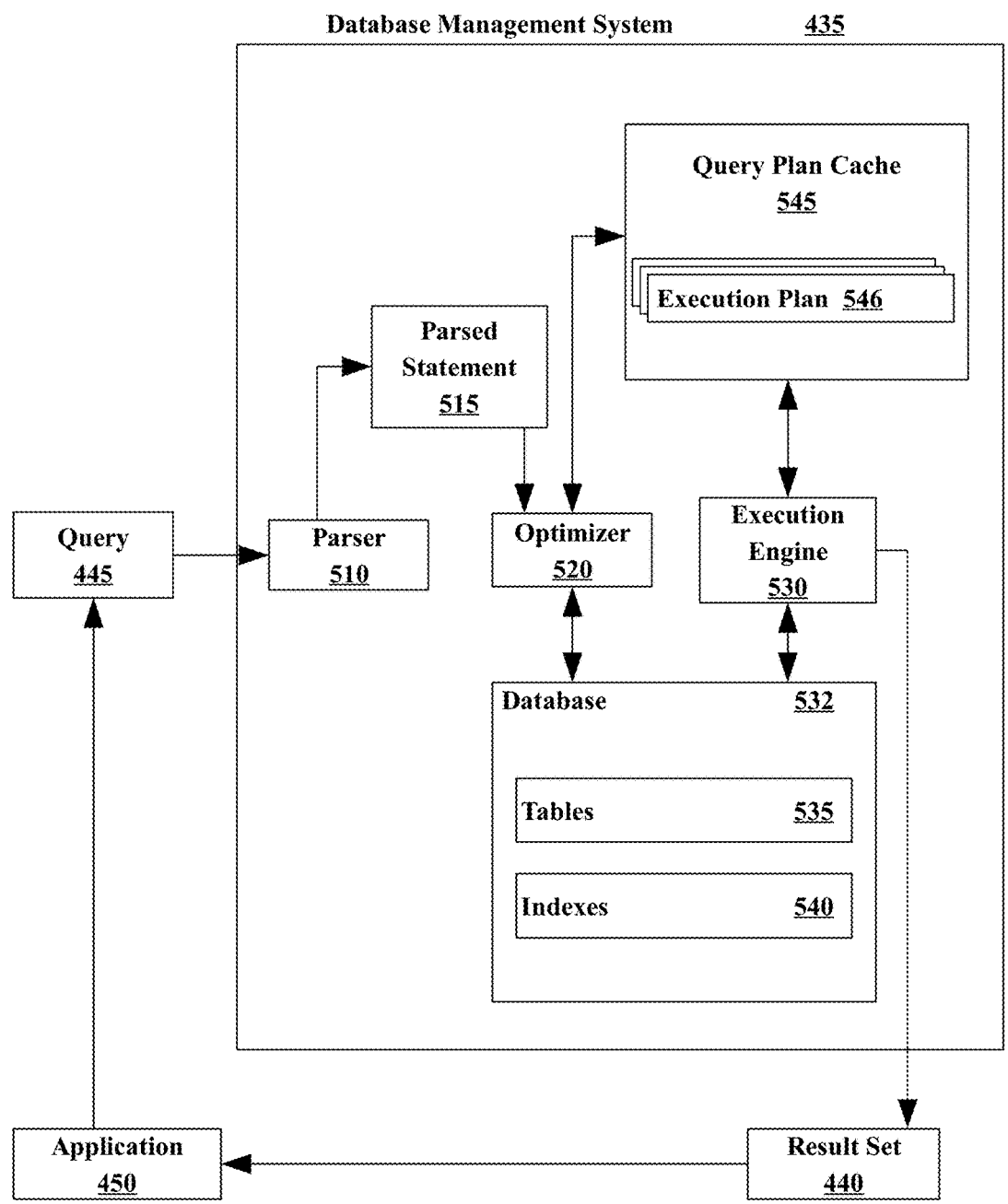
FIG. 5 illustrates an example database management system (DBMS) according to embodiments.

FIG. 5 illustrates an example database management system (DBMS) 435. The DBMS 435 may include a parser 510, an optimizer 520, an execution engine 530, and a database 532. The parser 510 may receive a database query 445 from an application 450. In some embodiments, the database query 445 may be in the form of a Structured Query Language (SQL) statement. The parser 510 may generate a parsed statement 515. The parser 510 may send the parsed statement 515 to an optimizer 520. The optimizer 520 may attempt to optimize the parsed statement. In some embodiments, optimizing may improve the performance of the database query 445 by, for example, reducing the amount of time it takes to provide a user with a response. The optimizer 520 may generate an execution plan 546 (may also be referred to as a query plan or an access plan), which may be maintained in a query plan cache 545, according to some embodiments. The query plan cache 545 may include one or more execution plans 546, including the current execution plan as well as previously used execution plans. Once an execution plan 546 is generated, the execution plan 546 may be sent to the execution engine 530. The execution engine 530 may execute the query 445. Executing the query 445 may include finding and retrieving data in the database tables 535 that satisfies the criteria supplied in the query 445. The execution engine 530 may store the data returned matching the query 445 in a result set 440. The DBMS 435 may return the result set 440 to an application 450, such as the application in which the database query 445 was generated, as a response to the database query 445.

A database 532 may include one or more tables 535 and, in some embodiments, one or more indexes 540. A database table 535 may organize data into rows and columns. Each row of a database table 535 may correspond to an individual entry, a tuple, or a record in the database 532. A column may define what is stored in each entry, tuple, or record. In some embodiments, columns of a table 535 may also be referred to as fields or attributes. Each table 535 within the database 532 may have a unique name. Each column within a table 535 may also have a unique name. A row, tuple, or record, however, within a particular table 535 may not be unique, according to some embodiments. A database 532 may also include one or more indexes 540. An index 540 may be a data structure that may inform the DBMS 435 of the location of a particular record within a table 535 if given a particular indexed column value. In some embodiments, the execution engine 530 may use the one or more indexes 540 to locate data within a table 535. In other embodiments, the execution engine 530 may scan the tables 535 without using an index 540.

As mentioned herein, the optimizer 520 creates the query access plan. The optimizer 520 may be implemented as computer program instructions that optimize the access plan in dependence upon database management statistics. Database statistics may reveal, for example, that there are only two identification values in a transactions table—so that it is an optimization, that is, more efficient, to scan the transactions table rather than using an index. Alternatively, database statistics may reveal that there are many transaction records with only a few transaction records for each identification value—so that it is an optimization, that is, more efficient, to access the transaction records by an index.

Figure 6:
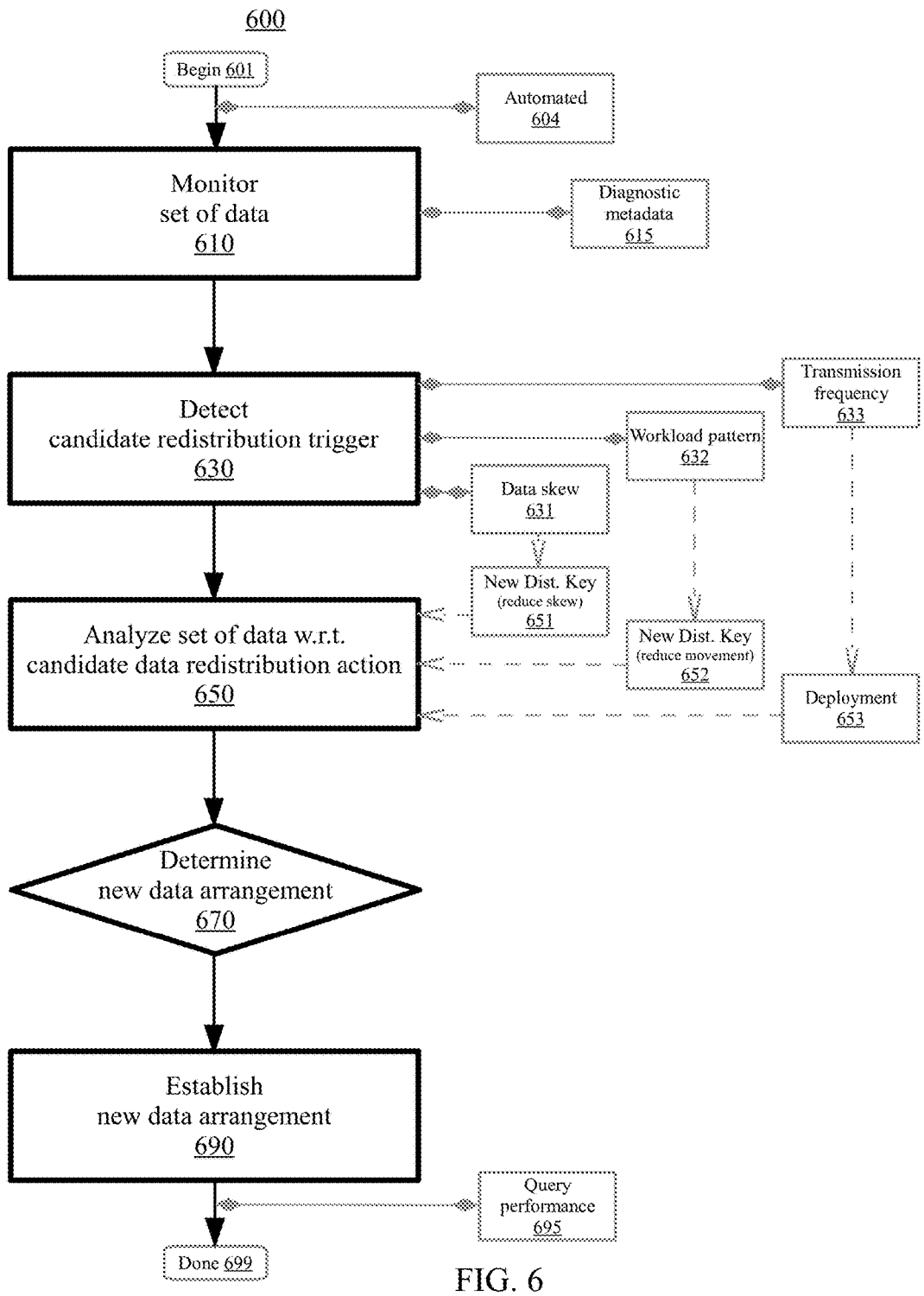
FIG. 6 is a flowchart illustrating a method for data arrangement management in a distributed data cluster environment of a shared pool of configurable computing resources, according to embodiments.

FIG. 6 is a flowchart illustrating a method 600 for data arrangement management in a distributed data cluster environment of a shared pool of configurable computing resources, according to embodiments. The method may begin at block 601. In embodiments, the operational steps (e.g., the monitoring, the detecting, the analyzing, the determining, the establishing) each occur in an automated fashion (e.g., automatically by a computer) without user/manual intervention (e.g., without manual action using automated computing machinery) at block 604. In certain embodiments, the data arrangement management is repeated (e.g., performed-again, replayed) in a continuous fashion (e.g., automatically nonstop without interruption) to adapt to a workload change (e.g., adjust for task/job modifications, change in a type of query that is carried-out).

At block 610, a set of data is monitored for a data redistribution candidate trigger. For instance, monitoring can include observing (e.g., watching a reference point), querying (e.g., asking a question), searching (e.g., exploring for a reason), obtaining (e.g., recording a collection), probing (e.g., checking a property), scanning (e.g., reviewing a sample), surveying (e.g., polling a constituent), or tracking (e.g., following a characteristic). The set of data can include actual data (e.g., contents of a table), a sample of actual data (e.g., portions of an index), or metadata of various types/forms (e.g., usage assessments/reports). In embodiments, the set of data includes a set of diagnostic metadata for the distributed data cluster environment at block 615. The set of diagnostic metadata may relate to stamps (e.g., timestamps), signatures (e.g., user identifiers), query requests (e.g., historical, current, forecast), error events (e.g., failure information), table control blocks (e.g., distributions thereof), or the like.

The data redistribution candidate trigger can include a data skew of a data structure (e.g., a first set of nodes is packed/crowded with data and a second set of nodes is relatively empty having little data), a data structure which indicates a workload pattern (e.g., columns that are commonly being joined), a data structure which exceeds a data transmission frequency threshold (e.g., a table/index often being transmitted over a network to various sets of nodes), or the like. At block 630, the data redistribution candidate trigger is detected with respect to the set of data. Detecting can include sensing, discovering, scanning, or identifying an attribute related to the data structure.

At block 650, the set of data is analyzed. The analyzing may be based on the data redistribution candidate trigger. The analyzing may be with respect to a candidate data redistribution action. For instance, analyzing can include extracting (e.g., creating a derivation), examining (e.g., performing an inspection), dissecting (e.g., scrutinizing an attribute), parsing (e.g., deciphering a construct), comparing (e.g., relating an assessment), or classifying (e.g., assigning a designation). Data analysis may include a process of inspecting, cleaning, transforming, or modeling data to discover useful information, suggest conclusions, or support decisions. Data analysis can extract information/patterns from a data set and transform/translate it into an understandable structure (e.g., a data report which can be provided) for further use. Generally, the candidate data redistribution action can include a set of operations which apportion, distribute, or allocate the data differently (e.g., repositioning tables/indexes, scattering portions of data, batching bunches of data) across the distributed data cluster. In various embodiments, the candidate data redistribution action includes a new distribution key. In certain embodiments, the new distribution key can be range-based (e.g., the distribution key uses an interval within an extent of numeric values to apportion data slices), hash-based (e.g., the distribution key is hashed to a numerical value of a table and rows with the same hash value are distributed to the same data slice), or the like.

In embodiments, detecting the data redistribution candidate trigger includes detecting a data skew of a data structure (e.g., table, index) which exceeds a threshold data skew value at block 631. In such embodiments, the candidate data redistribution action may include a new distribution key for the data structure to reduce the data skew of the data structure at block 651. For example, the set of data may be distributed across ten partitions (e.g., P1, P2, P3, . . . ) of an example cluster in a shared-nothing manner where the partitions own (e.g., store, process) various portions (e.g., a percentage) of the data. Accordingly, the example cluster may include an apportionment of P1 having 10%, P2 having 22%, P3 having 5%, P4 having 12%, P5 having 2%, P6 having 8%, P7 having 4%, P8 having 6%, P9 having 20%, P10 having 11%. An example threshold data skew value may be 15%. As such, the data redistribution candidate trigger may be detected with respect to P2 (22%) and P9 (20%). Accordingly, a new distribution key may be selected such that no single partition exceeds ownership of 15% of the data. For instance, the old distribution key may have distributed data based on a day number of the year (e.g., January 5 is day 5) with the intent to spread the data across the ten nodes by shifting partitions for every 36/37 days (e.g., days 1-36 on P1, days 37-73 on P2, and so on). However, the old distribution key did not account for the fact that more data is present in February and November than for other months (as such days 32-59 and days 305-334 have more data). The new distribution key be chosen such that data for each successive day is placed on the next partition in sequence (e.g., day 1 on P1, day 2 on P2, day 3 on P3, . . . day 358 on P8, day 359 on P9, day 360 on P10, . . . ). Accordingly, the example cluster may include a new candidate apportionment of P1 having 11%, P2 having 11%, P3 having 11%, P4 having 11%, P5 having 10%, P6 having 10%, P7 having 9%, P8 having 9%, P9 having 9%, P10 having 9%. The example is illustrative and other possibilities are contemplated.

In embodiments, detecting the data redistribution candidate trigger includes detecting a data structure which indicates a workload pattern (e.g., expensive data movement, information related to historical queries, predicted join probabilities) at block 632. In various embodiments, the workload pattern includes a join on a common column (e.g., based on product type, based on department, based on state/location of transaction). In certain embodiments, the workload pattern includes a set of query accesses which use a join key column other than a current distribution key column (e.g., if the current distribution key column is a first sequential column then find join key columns of query accesses which are joined based on columns other than the first sequential column). The join key column may be determined when it exceeds a threshold percentage of use in the set of query accesses relative to a total number of query accesses (e.g., 20% of queries are joined based on state/location of transaction). In embodiments, the candidate data redistribution action can include a new distribution key for the data structure to change the workload pattern to reduce data movement during a query operation at block 652. For example, a clustering technique (e.g., k-means clustering) may be used or a heat-map may be constructed to identify workload patterns involving one or more columns. In response, a new version/copy of the data structure may be created using a different distribution key column. As such, queries may be directed to the new version/copy of the data structure and the queries may be responded-to/handled using fewer net computing resources (e.g., network bandwidth, processor/memory hardware usage) than previously. Accordingly, without generating a new version/copy of a large table, significant/expensive data movement may occur because the large table is not distributed on a common join key (e.g., as measured by computing resources used or time-taken to process a query). As another example, if a small table is not instantiated to a number of the partitions of the cluster, a computing resources may be utilized in accessing the small table on other partitions. As such, instantiating the small table on more (e.g., all) partitions may reduce data movement and computing resources utilized. The example is illustrative and other possibilities are contemplated.

In embodiments, detecting the data redistribution candidate trigger includes detecting a data structure which exceeds a data transmission frequency threshold at block 633. In such embodiments, the candidate data redistribution action may include deploying the data structure which exceeds the data transmission frequency threshold to at least a threshold number of partitions in the distributed data cluster environment at block 653. For example, a particular data structure may frequently be transmitted to various partitions/nodes for utilization by the receiving partition/node to perform processing operation(s). When transmission of the particular data structure (e.g., Table A, Index Q of Table A) occurs more often than the predetermined frequency (e.g., more than once per day), the data structure may be deployed to selected partitions/nodes (e.g., half of the nodes, those nodes with related data). In certain embodiments, when transmission of the particular data structure occurs even more often than the predetermined frequency (e.g., double the predetermined frequency such as more than twice per day), the data structure may be deployed to all partitions/nodes. As such, a data structure which is using network bandwidth on a regular basis or beyond a threshold amount in a certain temporal period may be placed on more partitions/nodes to reduce overall computing resources utilization and make queries run more efficiently. For example, Table A may reside on a first partition but is consistently being utilized by a second partition and a third partition. Such utilization may cause a slowdown of network bandwidth due to data traffic between the partitions in response to a query. By deploying Table A to both the second and third partitions, deployment may be selectively performed such that total resource usage is reduced (e.g., deployment is performed when an abundance of network bandwidth is available and residence on the partitions allows for better responsiveness to the query when network bandwidth is more constrained). The example is illustrative and other possibilities are contemplated.

At block 670, a new data arrangement associated with the set of data is determined. The determination may be made using the candidate data redistribution action (e.g., based on a new distribution key as described herein). Determining can include resolving, identifying, evaluating, formulating, or computing. Various simulations may be performed in order to ascertain whether the new data arrangement is a more efficient arrangement than the current arrangement or other candidate arrangements. For instance, a first expected resource usage for a current data arrangement of the set of data may be computed. A second expected resource usage for the new data arrangement may be computed. The first and second expected resource usages can be compared. Based on the first expected resource usage exceeding the second expected resource usage, the new data arrangement may be selected. The first and second expected resource usages can be projected utilization factors of computing capabilities such as network bandwidth factor(s), processor factor(s), memory factor(s), disk factor(s), or the like. For example, determination can include resolving how to distribute, allocate, or apportion the set of data across various partitions in the new data arrangement (e.g., apportioning the data for load-balancing purposes, packing certain types of data together, striping similar data across multiple nodes). In embodiments, a selection with respect to whether to initiate establishment of the new data arrangement may be presented to a user (e.g., in response to determining the new data arrangement). Accordingly, the selection to initiate establishment of the new data arrangement may be received from the user (e.g., in advance of establishing the new data arrangement, to authorize what has already be established). Other possibilities for making the determination are contemplated.

At block 690, the new data arrangement is established (in the distributed data cluster environment). Establishing can include creating, generating, compiling, structuring, constructing, assembling, outputting, forming, organizing, providing, presenting, or introducing. As such, at least a portion of the set of data may have different logical or physical locations in the new data arrangement. For example, a subset of the set of data which previously resided on a first partition may now reside on a second partition. In certain embodiments, the subset of the set of data may still also reside on the first partition. Accordingly, the new data arrangement can positively impact a query performance metric when running a query in the distributed data cluster environment at block 695. The query performance metric may include temporal elements such as (total) processing time or (total) computing resource usage. For instance, statistics may be captured (such as a temporal value) for a query (e.g., run-time, query speed, time saved) to serve as a comparison before and after the new data arrangement. Other possibilities are also contemplated.

In certain embodiments, usage of the data arrangement management may be metered. Usage factors may correlate to charge-back or cost burdens which can be defined in-advance (e.g., utilizing usage tiers) or scaled with respect to a market-rate. An invoice or bill presenting the usage, rendered services, fee, and other payment terms may be generated based on the metered use. The generated invoice may be provided (e.g., displayed in a dialog box, sent or transferred by e-mail, text message, initiated for traditional mail) to the user for notification, acknowledgment, or payment.

Method 600 concludes at block 699. Aspects of method 600 may provide performance or efficiency benefits for data arrangement management. For example, aspects of method 600 may have positive impacts with respect to redistributing data for query performance in a distributed cluster (in an automated fashion). Altogether, performance or efficiency benefits (e.g., speed, flexibility, load balancing, responsiveness, high availability, resource usage, productivity) may occur in a distributed data cluster environment of a shared pool of configurable computing resources (e.g., cloud).

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for data arrangement management in a distributed data cluster environment of a shared pool of configurable computing resources, the method comprising:
   monitoring, in the distributed data cluster environment, a set of data for a data redistribution candidate trigger;
   detecting, in the distributed data cluster environment, the data redistribution candidate trigger with respect to the set of data, wherein detecting the data redistribution candidate trigger comprises:
      detecting a data structure which indicates a workload pattern;
   building a new distribution key for the data structure to change the workload pattern to reduce data movement during a query operation;
   determining, based on the new distribution key, a new data arrangement associated with the set of data, and comparing the new data arrangement with a current data arrangement to determine which data arrangement is more efficient based on resource usage; and
   in response to determining that the new data arrangement is more efficient than the current data arrangement, establishing, based on the new distribution key, the new data arrangement in the distributed data cluster environment such that at least a portion of the set of data comprises a different physical location in the new data arrangement.

2. The method of claim 1, wherein the new data arrangement positively impacts a query performance metric when running a query in the distributed data cluster environment.

3. The method of claim 1, wherein the workload pattern includes one or more of a join on a common column and a set of query accesses which use a join key column other than a current distribution key column.

4. The method of claim 1, wherein the new distribution key is range-based or hash-based.

5. The method of claim 1, further comprising:
   presenting, to a user in response to determining the new data arrangement, a selection with respect to whether to initiate establishment of the new data arrangement; and
   receiving, from the user in advance of establishing the new data arrangement, the selection to initiate establishment of the new data arrangement.

6. The method of claim 1, wherein monitoring the set of data, detecting the data redistribution candidate trigger, building the new distribution key, determining the new data arrangement, and establishing the new data arrangement each occur in an automated fashion without user intervention.

7. The method of claim 1, further comprising:
metering use of the data arrangement management; and
generating an invoice based on the metered use.

8. The method of claim 1, further comprising:
using a clustering technique to identify workload patterns involving one or more columns.

9. A computer-implemented method for data arrangement management in a distributed data cluster environment of a shared pool of configurable computing resources, the method comprising:
  detecting, in the distributed data cluster environment, a data redistribution candidate trigger with respect to a set of data, wherein detecting the data redistribution candidate trigger comprises:
    detecting a data skew of a data structure which exceeds a threshold data skew value, the data skew being a disproportionate distribution of the set of data across multiple partitions of the distributed data cluster environment;
  building a new distribution key for the data structure which exceeds the threshold data skew value to reduce the data skew of the data structure;
  determining, based on the new distribution key, a new data arrangement associated with the set of data, and comparing the new data arrangement with a current data arrangement to determine which data arrangement is more efficient based on resource usage; and
  in response to determining that the new data arrangement is more efficient than the current data arrangement, establishing, based on the new distribution key, the new data arrangement in the distributed data cluster environment such that at least a portion of the set of data comprises a different physical location in the new data arrangement.

10. The method of claim 9, wherein the set of data includes a set of diagnostic metadata for the distributed data cluster environment.

11. The method of claim 9, wherein the new data arrangement positively impacts a query performance metric when running a query in the distributed data cluster environment.

12. The method of claim 9, wherein the new distribution key is range-based or hash-based.

13. The method of claim 9, further comprising:
presenting, to a user in response to determining the new data arrangement, a selection with respect to whether to initiate establishment of the new data arrangement; and
receiving, from the user in advance of establishing the new data arrangement, the selection to initiate establishment of the new data arrangement.

14. The method of claim 9, wherein detecting the data redistribution candidate trigger, building the new distribution key, determining the new data arrangement, and establishing the new data arrangement each occur in an automated fashion without user intervention.

15. The method of claim 9, further comprising:
metering use of the data arrangement management; and
generating an invoice based on the metered use.

16. A computer-implemented method for data arrangement management in a distributed data cluster environment of a shared pool of configurable computing resources, the method comprising:
  detecting, in the distributed data cluster environment, a data redistribution candidate trigger with respect to a set of data, wherein detecting the data redistribution candidate trigger comprises:
    detecting a data structure which exceeds a data transmission frequency threshold by detecting data structures using network bandwidth beyond a threshold amount during a particular temporal period; and
  establishing, in the distributed data cluster environment, a new data arrangement by deploying the data structure which exceeds the data transmission frequency threshold to at least a threshold number of partitions in the distributed data cluster environment to reduce overall computing resources utilization such that at least a portion of the set of data comprises a different physical location in the new data arrangement.

17. The method of claim 16, wherein the set of data includes a set of diagnostic metadata for the distributed data cluster environment.

18. The method of claim 16, wherein the new data arrangement positively impacts a query performance metric when running a query in the distributed data cluster environment.

19. The method of claim 16, wherein detecting the data redistribution candidate trigger and establishing the new data arrangement each occur in an automated fashion without user intervention.

20. The method of claim 16, further comprising:
metering use of the data arrangement management; and
generating an invoice based on the metered use.

* * * * *